April 21, 1959 W. H. FAULKNER, JR., ET AL 2,883,552
RADIATION THICKNESS MEASUREMENT
Filed April 29, 1955 2 Sheets-Sheet 1

WILLIAM HARRISON FAULKNER, JR.
JAMES W. SHEARER
VICTOR C. WOODWORTH
*INVENTORS*

BY *James E. Olson*
ATTORNEY

April 21, 1959  W. H. FAULKNER, JR., ET AL  2,883,552
RADIATION THICKNESS MEASUREMENT
Filed April 29, 1955  2 Sheets-Sheet 2

WILLIAM HARRISON FAULKNER, JR
JAMES W. SHEARER
VICTOR C. WOODWORTH
*INVENTORS*

BY *Spencer E. Olsen*

ATTORNEY

United States Patent Office 2,883,552
Patented Apr. 21, 1959

2,883,552

RADIATION THICKNESS MEASUREMENT

William Harrison Faulkner, Jr., Weston, James W. Shearer, Lexington, and Victor C. Woodworth, Somerville, Mass., assignors to Tracerlab, Inc., Boston, Mass., a corporation of Massachusetts Application April 29, 1955, Serial No. 504,988

22 Claims. (Cl. 250—83.6)

This invention relates to improvements in apparatus for measuring the weight per unit area and hence the thickness of homogeneous sheet materials.

In radiation-type thickness gauges of the absorption type, a source of penetrative radiation is disposed on one side of the material to be measured and a detector, usually an ionization chamber, yielding an output current which is a function of incident radiation, is placed on the other side thereof, opposite the source. Radiation is absorbed by the material in a manner now well known in the art, the degree of absorption being a measure of the weight per unit area of such material and where the material is homogeneous the gauge may be calibrated directly to indicate thickness. In prior apparatus of this type, a single source, designed to provide a collimated beam of radiation, was positioned directly opposite the center of the aperture of the ionization chamber, the spacing between the source and detector being determined by the area of the effective aperture of the detector, the intensity of the radioactive source, the statistical error which may be tolerated in the measurement of the thickness of the material, the time constant of the measuring system and the efficiency of the detector itself. The sheet material passes through the gap between the source and detector without contacting either, and in order that the gauge be capable of accepting wide sheets of material, while maintaining a predetermined spacing between source and detector, the source and detector are supported on a suitable frame, for example, at the extremities of the arms of a rigid C-shaped frame. In some applications, the arms of the C-frame may be as much as 8 to 12 feet long and although formed of heavy material, are susceptible to some deflection and vibration which affects the spacing between the source and detector.

This prior arrangement of source and detector is somewhat critical to the placement of sheet material between the source and detector in that movement of the sheet toward or away from the source, known as "flutter," may affect the amount of radiation received by the detector. Another, and more serious disadvantage arises from relative movement of the source and detector which results in a change in geometry and changes in the effective efficiency of the detector for measuring the radiation from the source. This relative movement may result from differences in the thermal expansion of the two arms of the C-frame, deflection of the upper arm of the C-frame toward the other due to the weight of the structure, or mechanical vibration of the frame.

Another arrangement of source and detector which is coming into prominence, primarily for the measurement of very wide sheet material, comprises a radioactive source mounted in a suitable housing and supported on a track for scanning movement across the sheet, and a detector supported on another track on the opposite side of the sheet from the source and arranged for scanning across the sheet in synchronism with the source. The opportunity for variations in the geometry of the source and detector are obviously much greater in this arrangement than in the rigid C-frame mounting of the source and detector in that back-lash in the driving mechanism for the source and detector, variations in the mounting structure, etc., can easily cause variations in the relative positions of the source and detector. Very small variations in the relative positions of the source and detector result in appreciable errors, it being practically impossible to maintain mechanical tolerances to a point where these errors will be eliminated.

With an appreciation of the foregoing shortcomings of prior art thickness gauges, applicants have as a primary object of the present invention to provide apparatus for the measurement of the mass per unit area of sheet material by a radiation technique wherein there may be appreciable relative movement between the source and detector without appreciably affecting the amount of radiation energy received by the detector.

It is another object of the invention to provide an improved apparatus for measuring the weight per unit area of sheet material by a radiation transmission technique wherein the sheet material may range in its position between the source and detector without substantially affecting the amount of radiation energy received by the detector.

Another object of the invention is to provide an improved thickness gauge for sheet materials wherein relative movement between source and detector in any direction does not materially affect the effective efficiency of the detector in measuring the radiation from the source.

In brief, the present invention contemplates the provision, in a transmission-type of radiation thickness gauge including a detector with a generally polygonal radiation-receiving aperture, of a plurality of radioactive sources instead of the usual single source. The sources are displaced from the axis of the detector and are so arranged relative to the effective aperture of the detector, that a decrease in detected radiation from one or more of said plurality of sources due to relative movement of the sources and detector is compensated for by an increase in detected radiation from others of said plurality of sources such that the total detected radiation is maintained substantially constant.

In accordance with the most basic form of the invention, two radioactive sources of substantially equal intensity are provided, the sources being spaced apart by a distance generally corresponding to the diameter of the aperture of the detector and equally spaced on either side of an axis normal to the plane of the aperture at the center thereof. Additionally, the two sources are positioned on an axis which is parallel to the direction in which the greatest relative transverse movement of sources and detector is likely to occur.

In another embodiment of the invention, four sources are provided, two equal strength sources being positioned as above-described, the other two, which are equal to each other in strength, but not necessarily equal in strength to the first-mentioned two, being similarly disposed in the plane of the first two but on an axis removed 90° from the axis through the first pair.

In yet another embodiment of the invention, a radioactive source having an active area in the form of an annular ring is employed, thus effectively providing an infinite plurality of sources. The plane of the ring source is parallel to the plane of the aperture of the detector and spaced therefrom as before, the ring source being arranged coaxially with the aperture of the detector and having a mean diameter substantially equal to the diameter of the detector aperture.

Further, in accordance with the teachings of the invention, the source may comprise an "infinite plane" source, with the radioactivity uniformly distributed over an area which is considerably greater than the area of the detector aperture, thus providing, in effect, an infinite plurality of point sources of equal strength.

The novel features that are considered characteristic of the invention are set forth in the appended claims. The invention itself, however, both as to its organization and its method of operation, together with further objects and advantages thereof will best be understood by reference to the following description and drawings, in which:

Figure 1:
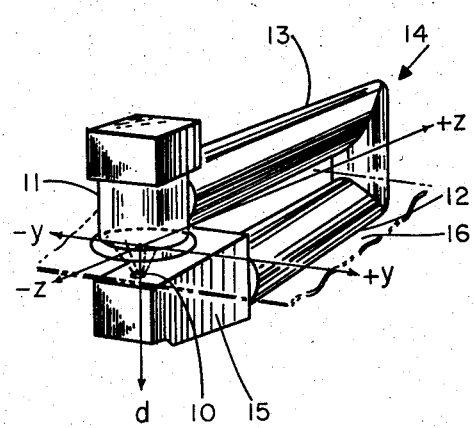
Fig. 1 is a perspective view of a prior art absorption-type thickness gauge, on which is indicated a coordinate system useful in explaining the utility of the present invention.

Referring now to Fig. 1, a form of prior art radiation thickness measuring apparatus which has found wide acceptance consists essentially of a source of radiation 10 and a radiation detector 11 supported in spaced-apart relationship at the extremities of the arms 12 and 13, respectively, of C-frame 14. Detector 11 normally comprises an ionization chamber of cylindrical shape, as shown, the source 10 being mounted in a suitable source mount 15 and disposed directly below the center of the circular aperture of the ionization chamber. The C-frame supporting structure permits acceptance of wide sheets of material 16 in the gap between the source and detector, and the entire mount is usually mounted for movement transverse to the direction of travel of the sheet material. In order to maintain the spacing between the source and detector with some degree of constancy, the C-frame is necessarily of heavy construction. The radiation from source 10 is collimated into a conical beam to an extent that substantially the entire radiation pattern, except, of course, the radiation which is absorbed by material 16, is intercepted by the ionization chamber.

As was briefly outlined above, the gauge of Fig. 1 is very sensitive to changes in geometry between the source and detector, which variations may result from variations in the spacing between the source and detector, relative displacement of the source and detector in the direction of movement of the sheet material, or relative movement of the source and detector in the direction of the axes of the arms of the C-frame. To facilitate the following description of the dependence of such variations, the orientation of source and detector has been illustrated in a coordinate system, changes in the spacing between the source and detector being considered as movement along the $d$-axis; relative lateral movement of the source and detector as the gauge is viewed from the front being considered as movement along the $y$-axis; and relative lateral movement as the gauge is viewed from the side being considered as motion along the $z$-axis. As illustrated, the origin "O" of this coordinate system (i.e. $y=0$, $z=0$, and $d=0$) is at the center of the aperture of chamber 11, with plus and minus variations in $d$, $y$ and $z$ being as indicated on Fig. 1.

Figure 2:
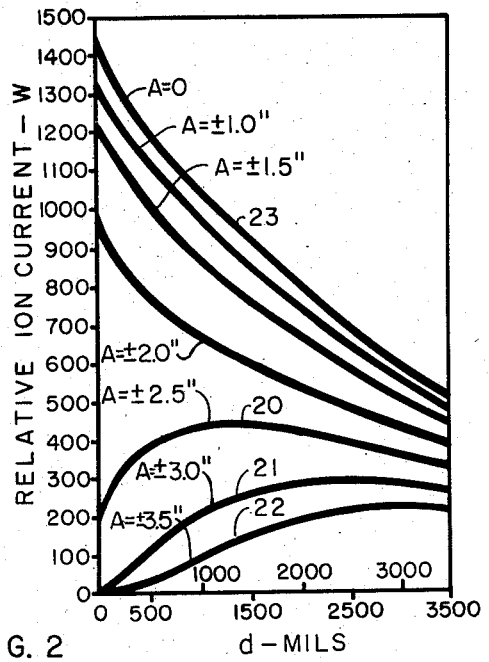
Fig. 2 is a family of curves illustrating the dependence of the detection efficiency of the detector on variations in axial spacing of the source and detector for different displacements of the source from the axis of the detector.

To analyze the dependence of detected radiation on variations along the $d$-axis in a one-source gauge, the source was initially placed at the above-defined origin and the ion current was measured for increasing values of $d$ for various positions, A, of the source along the $y$-axis, from which the family of curves shown in Fig. 2 was plotted, the chamber used in the investigation having an effective circular aperture of about 4.75 inches. In this plot, the ordinate is proportional to measured ion current and on the abscissa is plotted the spacing between the source and detector, $d$. It is seen from these curves, particularly those designated 20, 21 and 22, that by displacing the source from the center of the chamber along the $y$-axis, that points exist in the source-chamber coordinate system where the rate of change of ion current with changes in spacing is substantially equal to zero. These null points exist over larger ranges of values of $d$ for increasing values of A, and the substantially flat regions on either side of these null points is broader as A is increased. These substantially flat portions of these curves indicate that for a location of a single source near the edge of the detector aperture, there is a very small percentage change in ion current for a given change in the spacing, $d$, at the expense, however, of decreased ion current. The reduction in the dependence of spacing on ion current resulting from displacement in the source will be seen from a comparison of curve 23 of Fig. 2 with curve 21, for example, at a normal spacing of source and detector of 2000 mils. In this region, curve 23 is quite steep, indicating a marked dependence on variation in the dimension $d$, while curve 21 is substantially flat. The same effect occurs whether the source is positioned at $y=+A$ or $y=-A$, and accordingly, in order to meet the other requirements discussed below, at least two sources, respectively located at $y=+A$ and $y=-A$, may be used. Thus, with proper displacement of a single source, or two sources, from the central axis of the detector aperture, accurate measurement of the sheet material may be achieved in spite of variations in axial spacing between the source and detector, provided the $y$ and $z$ dimensions are held to close limits.

In practice, however, it is extremely difficult to hold a fixed orientation between source and detector within sufficiently close limits, and errors introduced by relative movement of the source and detector in the $y$-direction, unless compensated for, are rather serious. It has been found that compensation for relative movement between the source and detector, especially in the $y$- and $z$-directions may be accomplished utilizing the two source arrangement suggested above, namely, with two substantially equal intensity sources respectively positioned on the plus and minus $y$-axes at a predetermined distance from the center of the detector aperture. Other source arrangements which will be described hereinafter are also effective in achieving such compensation, but it will be convenient to explain the operation of the two source system schematically illustrated in Fig. 3. Consider the general case where a single ionization chamber 11 is supported at a distance D from the plane of the two sources 26 and 27 (this distance having been selected on the basis of the curves of Fig. 2), which are respectively positioned on the $+y$ and $-y$ axes at a predetermined distance A from the origin of the coordinate system of Fig. 1. The radiation from the two sources is collimated, and since the sources are symmetrically arranged relative to the detector, substantially equal portions of the two beams are intercepted. The two sources are mounted in a suitable source mount, diagrammatically illustrated at 28, so as to maintain a constant distance between the sources. Consider now that the detector 11 is maintained in a fixed position, and that source mount 28 is displaced along the $y$-axis in the positive direction by an increment $\Delta y$.

It will be apparent that the beam of radiation from source 26 will leave the chamber along the y-axis by an increment Δy, whereas the beam from source 27 will enter the chamber along the y-axis by a like increment Δy. The same result obtains for movement of both sources in the negative y-direction as well as for movement of the chamber with respect to the two sources. Therefore, whenever relative movement along the y-axis occurs between the source mount and detector from the neutral position, one source contributes some amount less than, say $R_1$, to the total ion current while the other source contributes some amount more, say $R_2$, where $R_1$ does not necessarily equal $R_2$. The amount by which $R_1$ differs from $R_2$ for relative movement of source mount and detector along the y-axis from the neutral position is the measure of error for sources located at $y = \pm A$.

Figure 4:
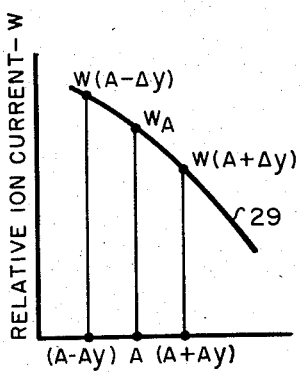
Figs. 4 and 5 are curves useful in explaining the operation of the apparatus depicted in Fig. 8 and schematically shown in Fig. 3.

To calculate what the errors are for sources located at these positions and to determine an optimum value of $+A$ and $-A$ for a given value of $d$, reference is made to Fig. 4, where curve 29 represents the dependence on measured ionization current (W) of relative displacement of a single source along the y-axis with a previously selected separation between the sources and the detector. At the neutral position, i.e., with one source at $+A$, the ion current is $W_A$, or, if two sources are used (the other located at $-A$), the total ion current is equal to $2W_A$. If now relative movement by an amount Δy occurs between the source mount and chamber, one source will contribute an ion current designated $W(A-\Delta y)$ while the other source will contribute an amount designated $W(A+\Delta y)$. The residual ion current, $\Delta W_R$, will be $$\Delta W_R = 2W_A - [W(A+\Delta y) + W(A-\Delta y)] \quad (1)$$

where the residual ion current is the difference between the total ion current at the neutral position and the total ion current for sources located $\pm \Delta y$ from the neutral position.

Writing the Taylor expansions for motion about the point $y=A$, on the curve of Fig. 4, $$W(A+\Delta y) = W_A + \Delta y \left(\frac{dW_A}{dy}\right)$$
$$+ \frac{(\Delta y)^2}{2}\left(\frac{d^2 W_A}{dy^2}\right) + \frac{(\Delta y)^3}{6}\left(\frac{d^3 W_A}{dy^3}\right) + \cdots \quad (2)$$

$$W(A-\Delta y) = W_A - \Delta y \left(\frac{dW_A}{dy}\right)$$
$$+ \frac{(\Delta y)^2}{2}\left(\frac{d^2 W_A}{dy^2}\right) - \frac{(\Delta y)^3}{6}\left(\frac{d^3 W_A}{dy^3}\right) + \cdots \quad (3)$$

Substituting Equations 2 and 3 in Equation 1, and neglecting the higher order terms, $$(\Delta W_R) = (\Delta y)^2 \frac{d^2 W_A}{dy^2} \quad (4)$$

In considering gauge design, it is conventional to designate the nominal weight of the material being measured as $x$, and the absorption coefficient of the material as $\mu$, the measured ionization current being indicated in terms of absorber weight W. It can be shown that the fractional change, $\Delta W/W$, in ion current caused by a change in absorber weight $\Delta x$ from the nominal value is substantially as follows, $$\frac{\Delta W}{W} \doteq \mu \Delta x \quad (5)$$

Rearranging Expression 4 and dividing both sides by $W_A + W_A = 2W_A$, to obtain the error for two sources, $$\frac{\Delta W_R}{2W_A \Delta y} \doteq \frac{\Delta y}{2W_A} \cdot \frac{\Delta^2 W_A}{(\Delta y)^2} \quad (6)$$

The term, $\Delta W_R/2W_A \Delta y$, it will be seen, is of the same form as Equation 5 and gives the fractional change in measured ion current per unit distance departure of the two sources from the neutral position in terms of readily measured quantities $W_A$ and $\Delta y$.

Figure 5:
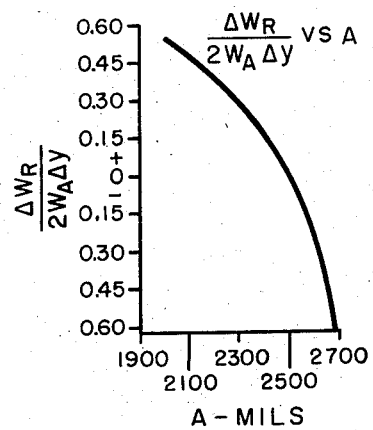

Considering a gauge having a detector aperture of about 4.75 inches, and with a spacing $d$ of about 2.5 inches (as derived from the curves of Fig. 2), the expression of Equation 6 as a function of increasing values of A is plotted in Fig. 5. It will be noted that for a value of $A=2515$ mils, the expression $\Delta W_R/W_A \Delta y = 0$, indicating that compensation is perfect. Accordingly, for the ionization chamber described above and a spacing of 2.5 inches, which will be understood to be illustrative only, two equal sources positioned at ±2515 mils on the y-axis will yield minimum error in measured ionization current due to relative movement of the source and detector in the y-direction. It will be noted from Fig. 2, that for this positioning of the sources, the dependence of measured ionization current on variations in the dimension $d$ is not serious. It will be understood that with other values of $d$, dictated to some extent by the nature of the sheet material and the process equipment on which it is handled, other locations of the source will be required, the optimum being a compromise between $d$ and $A$. In general, however, for normally encountered gap lengths, say 2 to 2.5 inches, two sources disposed on the y-axis substantially directly below the outer periphery of the effective aperture of the detector, afford satisfactory compensation.

The foregoing discussion has demonstrated that by proper placement of two substantially equal sources, the effects of relative displacements along the $d$- and y-axes are essentially eliminated. There remains to be examined what errors can be expected in the two-source arrangement due to relative displacement of the sources and detector along the z-axis of Fig. 1. This may be conveniently done by reference to Fig. 6 which graphically depicts in the plane defined by the y- and z-axes of Fig. 1, the effects of relative movement in a direction parallel to the z-axis. In this sketch, the heavy curved line BC represents a sector of the circumference of the aperture of the ionization chamber, the center of which is at O and on the y-axis. The point A located on the y-axis (corresponding to the point $-A$ in Fig. 3) is at the center of the solid line circle 30 which represents, somewhat ideally, the radiation distribution from a source located at point $-A$ on and about the chamber. If now the source is moved relative to the detector a distance Δz such that the center of the source is at E, the radiation pattern moves to the position depicted by the dotted circle 31. Since the radius of the ionization chamber is very large with respect to values of Δz which are likely to be encountered, the portion BC of the circumference of the aperture about which the radiation pattern moves very nearly approximates a straight line. Perfect compensation for motion along the z-axis would be obtained if the arc BC were a straight line, but as will be seen from the following discussion, the variation in ion current with changes in z are relatively insignificant.

Figure 6:
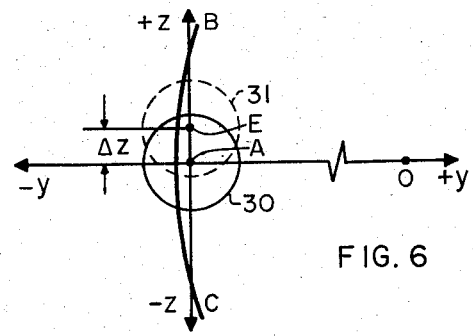
Fig. 6 is a sketch useful in explaining the manner in which the source arrangement of Figs. 3 and 8 compensates for relative movement of source and detector along the z-axis.

Since the ionization chamber is symmetrical about the z- and y-axes, it is possible to determine the variations in ion current due to relative movement along the z-axis from the information expressed in the curve of Fig. 4; that is, in terms of equivalent variations in y. It can be shown by simple geometry, that for the dimensions of a conventional gauge here under discussion, motion along the z-axis can be translated into a corresponding motion along the y-axis, according to the expression, $$\Delta y_z = \frac{(\Delta z)^2}{2Y}$$

where $\Delta y_z$ is the motion along the y-axis caused by movement of one source by an amount Δz along the z-axis, and Y is radius OA in Fig. 6. Thus, in a gauge having dimensions as described above, with $A=2500$ mils, relative movement of one source along the z-axis of 100 mils corresponds to a change in 2 mils of that source along the y-axis. For this reason, the magnitude of the corresponding error is, in practice, considerably reduced.

Summarizing the foregoing discussion, one source appropriately positioned with respect to the aperture of the detector provides compensation for relative movement of the source and detector along the $d$- and $z$-axes, and two equal sources appropriately positioned on the $y$-axis provide compensation for relative motion along all three axes simultaneously.

Figure 7:
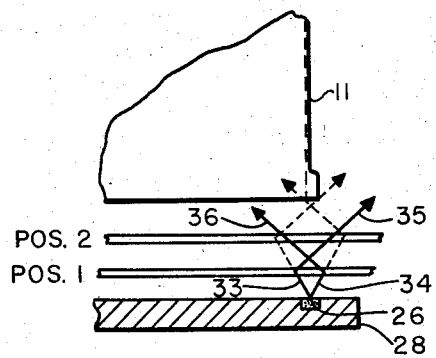
Fig. 7 is a sketch useful in explaining how the source arrengement of Fig. 3 overcomes errors due to flutter.

The primary object of the invention having been accomplished by the apparatus thus far described, consider now how errors due to "flutter" are reduced. Because of the symmetry of the sources, it is necessary only to consider one of the sources since the other source behaves in exactly the same way. Referring to Fig. 7, there is illustrated how the scattered radiation is believed to behave when the material to be gauged is placed in two different positions. In this sketch, one source, for example 26, is shown positioned essentially below the rim of the detector, as established in accordance with the foregoing to achieve compensation, arrows 33 and 34 representing two particles of radiation that might emanate from the source. Considering first the sheet material in position 1, the two particles 33 and 34 enter the material and upon interaction with the molecules of the material are subject to random scattering, and thus may emerge from the other side of the sheet material in any of several directions. For example, particle 33 which starts out in a direction where it would be expected to be intercepted by the detector may be scattered in the direction of arrow 35 and go undetected whereas the particle represented by line 34, which starts out in a direction so as to be undetected might be scattered in the direction of arrow 36 and be intercepted by the detector. Thus, so long as the source is positioned near the rim of the detector it is reasonable to expect that for every component of radiation that is scattered into the chamber by the material which would otherwise not be detected, there also exists a corresponding scattered ray which will not be detected by the chamber. Considering now the sheet material in position 2, the same conditions prevail except that now the radiation represented by arrow 33 might be scattered by the material and go undetected, whereas the particle represented by arrow 34, which would otherwise be undetected, may be scattered by the material while in position 2 and be detected by the detector. While only two particles have been represented in this explanation, it will be appreciated that with a large number of particles emanating from the source there is an averaging effect and essentially the same amount of radiation is detected regardless of the position of the sheet material between the source and detector.

Figure 8:
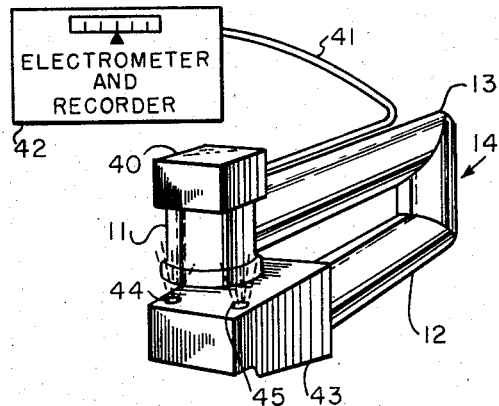
Fig. 8 is a perspective view of a preferred form of radiation thickness gauge according to the invention.

Fig. 8 illustrates an apparatus incorporating the foregoing features, which, except for the source mount, may be of substantially identical construction with the prior art apparatus of Fig. 1. A detector 11 is mounted at the extremity of the upper arm 13 of C-frame 14, the detector normally taking the form of an ionization chamber of cylindrical shape having a circular aperture at its lower end covered by a thin window capable of being penetrated by the radiation employed. It will be understood, however, that other detectors capable of producing a current in response to incident radiation and having an aperture of relatively large area may be substituted for the ionization chamber without departing from the spirit of the invention. The current produced in the ionization chamber 11 is amplified by a suitable amplifier, which may be housed in container 40, the amplified signal being coupled via conductor 41 to a suitable electrometer circuit and recorder 42, normally contained in a console remotely located from the gauging apparatus. A source housing 43 is secured to the extremity of the lower arm 12, on which are supported two separate sources of radiation 44 and 45. The sources of radiation may be a beta ray emitter or a gamma ray emitter of suitable half-life and energy, the type of radiation being selected primarily in accordance with the weight per unit area of the material to be measured. The source material is encapsulated, and may be arranged to provide a desired degree of collimation. A suitable shutter, or two separate shutters (not shown) are incorporated in the source mount 43 to provide a closure for the sources when the apparatus is not in use.

In accordance with the earlier theoretical discussion, the plane of the two sources is spaced from the plane of the aperture of ionization chamber 11 by a predetermined amount, the two equal strength sources being displaced equal amounts from the center of the detector aperture along the $y$-axis so as to be positioned essentially beneath the periphery of the aperture at diametrically opposite points. The exact location of the two sources 44 and 45 for optimum compensation, is subject to some adjustment, as explained above, depending on the size of the detector aperture, the degree of collimation of the radiation, the spacing determined to be optimum, and to account for slight variations in the strengths of the two sources. The material to be measured is passed between the sources and detector, the nominal pass-line of the material normally being somewhat nearer the sources than the detector window. Radiation is absorbed in the material in proportion to its weight per unit area, the unabsorbed radiation being measured by detector 11 and recorded in accordance with now well-known techniques. Thus, slight variations in thickness can be detected and recorded, and by virtue of the two source arrangement, variation in detector current which would normally result from changes in geometry of source and detector are substantially eliminated as fully described hereinabove.

Figure 9:
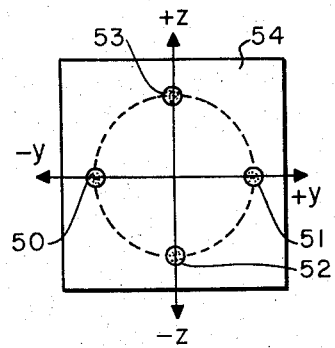
Figs. 9, 10, 11 and 12 illustrate four alternate source arrangements for the gauge of Fig. 8.

While the above-described two source arrangement has been found to be particularly effective, and is to be preferred from the standpoint of ease and cost of fabrication, it is to be understood that the invention is not limited thereto, but that other source arrangements embodying the invention, are likewise feasible. Assuming that a circular apertured detector is used, it will readily be seen from the description of Fig. 3 and the realization that the detector is symmetrical about the $y$- and $z$-axes, that compensation can be achieved for relative movement along the $y$- and $z$-axes by employing four sources, as shown in Fig. 9, two being disposed on the $y$-axis, namely 50 and 51, and the other two, 52 and 53 being similarly disposed on the $z$-axis. The four sources are supported on a common source mount 54 so as to maintain the sources in a fixed relationship with respect to each other. Sources 50 and 51 are of substantially equal intensity, as are 52 and 53, but the two pairs are not necessarily equal to each other. In any case, the individual source strengths are so selected that the total activity provides a detector current which can be conveniently handled.

Figure 10:
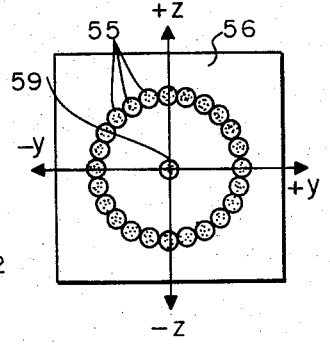
Figure 11:
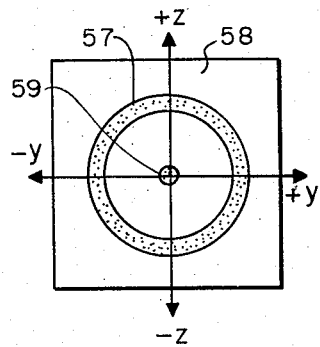

Two extensions of the four source arrangement are illustrated in Figs. 10 and 11, the former consisting of a plurality of individual sources 55 arranged in a circle having a diameter substantially equal to the diameter of the detector, and supported on suitable source mount 56. The source mount is positioned relative to the detector such that the aperture and the ring of sources are coaxial. In Fig. 11, the individual sources are replaced with a ring-shaped source having an active area represented by the annulus 57, suitably supported on source mount 58. As with the ring of Fig. 10, the mean diameter of the annular area 57 corresponds generally with the diameter of the detector and is arranged concentrically therewith. It will readily be appreciated that each of the arrangements of Figs. 10 and 11 consists of a plurality of sources, each having a corresponding source disposed diametrically opposite therefrom, whereby compensation is obtained for relative movement of the source mount and detector along any axis.

Figure 12:
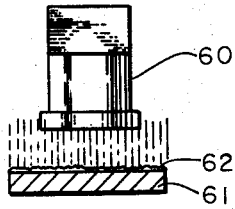

Compensation may also be achieved, in accordance with the invention, by employing a detector of finite area, for example, an ionization chamber, and an "infinite" source, which in a practical embodiment would be of substantially larger area than the detector. Such an arrangement is schematically illustrated in elevation in Fig. 12, wherein numeral 60 represents an ionization chamber, and 61 represents a source mount on which radioactive material 62 is uniformly distributed. The radiation from a source of this type is not collimated, and accordingly the same amount of radiation enters the chamber regardless of the lateral displacement of the detector relative to the source. It follows, therefore, that this configuration is entirely free from variations in measured ion current due to changes in geometry, or due to flutter.

Figure 3:
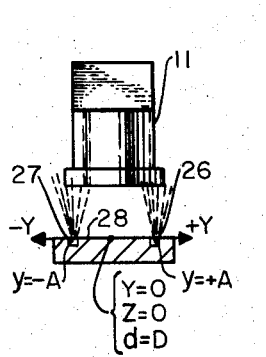
Fig. 3 is a sketch useful in explaining the theory of operation of the apparatus depicted in Fig. 8.

Reverting to the discussion of Figs. 3, 4 and 5, it will be recalled that in the two source method of compensating for relative movement in the y-direction there are residual deviations $\Delta W_R$ in ion current for all values of source-detector separations except one which may yield $\Delta W_R = 0$. This value of $d$, however, in a practical gauge, seldom coincides with the point where $\Delta W_d$, the deviation of ion current with $d$, is zero (Fig. 2). It being desirable to operate at the point where $\Delta W_d = 0$, the attendant residual $\Delta W_R$ may be sufficiently large to cause substantial error for large dimensional changes in the y-direction. Examination of Fig. 5 will show that by suitable selection of A, the value of the change $\Delta W_R$ may be made positive as the two source system moves away from the center. If a single source with a collimated radiation beam were additionally placed at the center, movement of it from the center would result in a decrease in its contribution to the total ion current. Therefor, by proper selection of source strength for a source positioned intermediate the two main sources, the center source deviation may be made to produce a compensating current, designated $\Delta W_C$, which is equal and opposite to $\Delta W_R$. The use of the auxiliary source would improve the compensation for movement in the y-direction, but would produce a larger error in the z-direction than if the auxiliary source were absent.

In the arrangements of Figs. 10 and 11, however, where for each individual source, there is a corresponding source disposed diametrically opposite, it will be seen that an auxiliary compensating source can be used to advantage, since the residual ion current $\Delta W_R$ is the same in all directions. Thus, in Figs. 10 and 11, the diameter of the ring is chosen to give a value of A to yield $W_d = 0$ at the selected source-detector spacing, $d$, and a compensating source 59 is located at the center of the ring. The absolute value of $\Delta W_R$ in a practical gauge being very small, it is possible to use a relatively low strength source at the center to exactly correct for variations in residual ionization current. Accordingly, a ring source of appropriate radius relative to the detector, in combination with a properly selected compensating source affords complete compensation for relative movement of source mount and detector in any direction.

Figure 13:
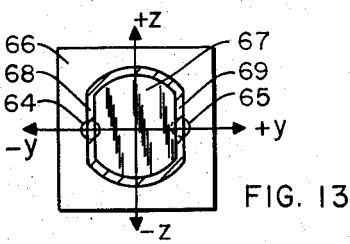
Fig. 13 is a plan cross-sectional view illustrating an alternate form of detector useful in the practice of the invention.

Returning briefly to the description of Fig. 6, it was there seen that if the arc BC were a straight line, perfect compensation for relative motion along the z-axis could be obtained employing but two sources. In Fig. 13 and ionization chamber which takes advantage of this observation is shown in horizontal cross-section. Instead of using a circular aperture, as in Fig. 8, the aperture is masked, or otherwise shaped, so that the effective area of the aperture has straight sides in the regions of its periphery on and about which the radiation patterns from the two sources impinge. That is, with two sources 64 and 65 mounted on a suitable source mount 66, and displaced along the y-axis from the center of the window 67 of the detector, the aperture is formed to have straight sides 68 and 69 normal to the y-axis in the regions above the sources, and curved in regions in the direction of the z-axis. Alternatively, the aperture 67 may be rectangular in shape with two opposite sides being oriented in the same manner as sides 68 and 69.

Various modifications, apart from those shown, will be apparent to those skilled in the art and may be made without departing from the spirit of the invention and it is therefore intended that the invention not be limited to what has been shown and described except as such limitations occur in the appended claims.

What is claimed is:

1. In thickness-measuring apparatus including a radiation detector having an effective aperture of polygonal shape supported a predetermined distance from a holder for a radioactive source and in which said detector and said source-holder are susceptible of relative lateral and axial movement, means for minimizing measurement errors due to such relative movement comprising a plurality of sources of radiation supported on said source-holder and arranged each to project substantially equal portions of its radiation into the aperture of said detector, said sources being so arranged relative to the periphery of said detector that variations in said predetermined distance result in minimum variations in total detected radiation and a decrease in detected radiation from one of said plurality of sources due to relative lateral movement of said detector and said source-holder is compensated by an increase in detected radiation from another of said plurality of sources so as to maintain substantially constant the total detected radiation.

2. In thickness-measuring apparatus including a radiation detector having an effective aperture of polygonal shape supported a predetermined distance from a holder for a radioactive source and in which said detector and said source-holder are susceptible of relative lateral and axial movement, means for minimizing measurement errors due to such relative movement comprising a plurality of at least two radioactive sources supported on said holder, said plurality of sources being arranged in pairs with the sources of a pair disposed opposite corresponding opposite portions of the periphery of the aperture of said detector and arranged to project substantially equal amounts of radiation into the aperture of said detector when said source holder and detector are properly oriented whereby variations in said predetermined distance cause minimum variations in total detected radiation and a decrease in radiation from one of the sources of a pair due to relative lateral movement of said detector and source-holder in a direction parallel to an axis through the sources of the said pair is compensated by an increase in detected radiation from the other source of said pair so as to maintain substantially constant the total detected radiation, said portions of the aperture of said detector approximating straight lines whereby insignificant variations in detected radiation result from relative movement of said detector and said source holder in a direction perpendicular to the aforesaid axis.

3. In transmission-type apparatus for measuring the weight per unit area of sheet material, a radiation detector having an effective aperture of finite area, a plurality of radioactive sources of penetrative radiation, means supporting said radiation detector a predetermined distance from said sources, said plurality of sources being so oriented relative to the effective aperture of said detector that for each of said plurality of sources there is a corresponding compensating source whereby a decrease in detected radiation from one of said plurality of sources due to relative movement of said sources and said detector is compensated by an increase in detected radiation from another of said plurality of sources and variations in said predetermined distance cause insignificant variations in the total detected radiation.

4. In transmission-type apparatus for measuring the weight per unit area of sheet material, a radiation detecting device having an effective aperture of polygonal shape, a plurality of radioactive sources of penetrative radiation, said sources being displaced from the axis of said aperture and arranged such that a decrease in detected radiation from one of said plurality of sources due to relative movement of said sources and said detector is compensated by an increase in detected radiation from another of said plurality of sources so as to maintain substantially constant the total detected radiation, and means supporting said radiation detecting device a predetermined distance from said sources at which distance variations in said distance cause insignificant variations in the total detected radiation.

5. In transmission-type apparatus for measurring the weight per unit area of sheet material, a radiation detecting device in the form of an ionization chamber having an effective aperture of generally circular shape, a plurality of sources of penetrative radiation, source-holding means supporting said sources in a common plane and in fixed relationship to each other, said sources being displaced substantially equidistantly from the axis of said aperture and arranged substantially opposite the periphery thereof, and means supporting said ionization chamber at a distance from the plane of said sources which offers minimum dependence in detected radiation on variations in said distance.

6. In transmission-type apparatus for measuring the weight per unit area of sheet material, a radiation detector in the form of an ionization chamber having an effective aperture of polygonal shape, a plurality of sources of penetrative radiation, a source holder supporting said sources in a common plane and in fixed relationship to each other, said sources being displaced substantially equidistantly from the axis of said aperture and arranged substantially opposite the periphery thereof, and means supporting said radiation detector and source holder to provide a spacing between the aperture of said detector and the plane of said sources which offers minimum dependence in detected radiation on variations in said spacing.

7. Apparatus in accordance with claim 6 having two sources of substantially equal strength disposed opposite diametrically opposite points on the periphery of the aperture of said ionization chamber whereby a decrease in detected radiation from one of said sources upon relative lateral movement of said detector and said source-holding means in a direction parallel to an axis through said sources is compensated by an increase in detected radiation from the other of said sources so as to maintain substantially constant the total detected radiation, said detector aperture having a shape and dimensions such that the portions of the periphery thereof in the region opposite said sources approximate straight lines whereby insignificant variations in detected radiation result from relative movement of said detector and said source-holder in a direction perpendicular to the aforesaid axis.

8. Apparatus in accordance with claim 6 having four radioactive sources, two of said sources being of substantially equal strength and disposed opposite diametrically opposite points on the periphery of said ionization chamber and on a first axis parallel to the expected direction of maximum relative lateral movement between said detector and said source-holder, the other two of said sources also being of substantially equal strength and disposed on a second axis perpendicular to said first axis.

9. Apparatus in accordance with claim 6 wherein said aperture is of circular shape and said plurality of sources are arranged in a circle on said source-holder, said circle being coaxial with said aperture and of substantially the same diameter.

10. Apparatus in accordance with claim 9 and an additional compensating source supported on said source-holder and disposed on the axis of said aperture.

11. Apparatus in accordance with claim 6 wherein said aperture is of circular shape and said sources comprise a radioactive surface of annular shape having a mean diameter substantially equal to the diameter of said aperture and coaxial therewith.

12. Apparatus in accordance with claim 11 and an additional compensating source supported on said source-holder and disposed on the axis of said aperture.

13. In transmission-type apparatus for measuring the weight per unit area of sheet material, an ionization chamber having an effective aperture of generally circular shape, a plurality of sources of radiation, a source-holder supporting said sources in a common plane and in fixed relationship to each other and arranged to provide collimation of the radiation from said sources, and means supporting said ionization chamber in spaced apart relationship with the plane of said sources, said sources being displaced substantially equidistantly from the axis of said aperture and disposed substantially opposite the periphery of said aperture whereby a decrease in detected radiation from one of said plurality of sources due to relative lateral movement between said sources and detector in a specified direction is compensated by an increase in detected radiation from another of said plurality of sources disposed diametrically opposite from said one source.

14. Apparatus for measuring the weight per unit area of sheet material comprising, a C-shaped frame having substantially parallel spaced apart arms, an ionization chamber supported at the extremity of one of said arms and having an effective aperture of generally circular shape, a plurality of sources of radiation, a source-holder secured to the extremity of the other of said arms for supporting said sources in a common plane parallel to the plane of said aperture and in fixed relationship to each other, said sources being displaced substantially equidistantly from the axis of said aperture and all being similarly disposed relative to the periphery of said aperture whereby a decrease in detected radiation from one of said plurality of sources due to relative lateral movement between said ionization chamber and said source-holding means in a specified direction is compensated by an increase in detected radiation from another of said plurality of sources disposed opposite said one source and in a direction therefrom which is parallel to said specified direction, the plane of said sources being separated from the aperture of said ionization chamber a predetermined distance which offers minimum dependence for detected radiation on variations in said distance.

15. Apparatus in accordance with claim 14 having two sources of substantially equal strength disposed on an axis perpendicular to the axes of the arms of said C-shaped frame, the aperture of said detector being sufficiently large that the portions of the periphery thereof opposite said sources approximate straight lines whereby insignificant variations in detected radiation result from relative movement of said ionization chamber and said source holding means in a direction parallel to the axes of the arms of said C-shaped frame.

16. Apparatus in accordance with claim 14 having four radioactive sources, two of which are disposed on an axis parallel to the axes of the arms of said C-shaped frame and the other two of which are disposed on an axis perpendicular to the axes of the arms of said C-shaped frame.

17. Apparatus in accordance with claim 14 including a plurality of individual encapsulated radioactive sources of substantially equal strength arranged in a circle on said source-holder, said circle being coaxial with the aperture of said ionization chamber.

18. Apparatus in accordance with claim 17 additionally including a compensating source supported on said source-holder at the center of said circle.

19. Apparatus in accordance with claim 14 including a radioactive surface of annular shape having a mean diameter substantially equal to the diameter of the aperture of said ionization chamber supported on said source-holder and arranged coaxially with the aperture of said chamber.

20. Apparatus in accordance with claim 19 additionally including a compensating source supported on said source-holder at the center of said annular area.

21. In transmission-type apparatus for measuring the weight per unit area of sheet material, a radiation detector in the form of an ionization chamber having an effective aperture of polygonal shape two sides of which are defined by straight parallel lines, a pair of sources of penetrative radiation, a source holder supporting said sources in a common plane parallel to the aperture of said detector and in fixed relationship to each other, said sources being displaced substantially equidistantly from the axis of said aperture and respectively arranged substantially opposite said straight lines, and means supporting said detector and said source holder to provide a spacing between the plane of the aperture of said detector and the plane of said sources which offers minimum dependence in detected radiation on variations in said spacing.

22. Apparatus for measuring the weight per unit area of sheet material comprising, a C-shaped frame having substantially parallel spaced apart arms, an ionization chamber having an effective aperture of polygonal shape two sides of which are defined by straight parallel lines, means attaching said ionization chamber to the extremity of one of said arms such that said straight lines are substantially equidistant from and parallel to the axis of the said one arm, a pair of sources of penetrative radiation, a source holder secured to the extremity of the other of said arms supporting said sources in a common plane parallel to the aperture of said chamber and in fixed relationship to each other, said sources being disposed on an axis normal to the axis of said other arm and substantially equidistantly from the central axis of said aperture substantially opposite said straight lines, the spacing between the plane of said sources and the plane of said aperture being such as to offer minimum dependence in detected radiation on variations in said spacing.

References Cited in the file of this patent

UNITED STATES PATENTS

| 2,203,706 | Stockbarger | June 11, 1940 |
| 2,525,292 | Fua et al. | Oct. 16, 1944 |
| 2,370,163 | Hare | Feb. 27, 1945 |
| 2,675,483 | Leighton | Apr. 13, 1954 |